United States Patent [19]

Dinter et al.

[11] Patent Number: 5,759,649

[45] Date of Patent: Jun. 2, 1998

[54] PLASTIC PACKAGING CONTAINER WITH IMPROVED ABILITY FOR ELECTROSTATIC CHARGE DERIVATION

[75] Inventors: Peter Dinter, Hallgarten; Joachim Nowotnick, Frankfurt, both of Germany

[73] Assignee: Hoechst Aktiengesellschaft, Germany

[21] Appl. No.: 521,591

[22] Filed: Aug. 30, 1995

[30] Foreign Application Priority Data

Sep. 1, 1994 [DE] Germany ............ 44 31 046.3

[51] Int. Cl.[6] .................. B65D 85/30; H01L 23/06
[52] U.S. Cl. .............. 428/35.3; 428/35.4; 428/35.9;
428/36.2; 428/138; 428/201; 428/204; 206/701;
206/719; 206/720; 206/524.4; 257/659;
257/698
[58] Field of Search .................. 428/35.2, 35.3,
428/35.4, 35.9, 36.2, 36.5, 36.4, 35.8, 137,
207, 204, 201, 138; 206/719, 720, 721,
709, 701, 524.2, 524.4; 257/659, 699, 698

[56] References Cited

U.S. PATENT DOCUMENTS

| | | | |
|---|---|---|---|
| 2,405,104 | 7/1946 | Mydans | 102/282 |
| 4,424,900 | 1/1984 | Petcavich | 206/720 |
| 4,653,640 | 3/1987 | Akao | 206/524.2 |
| 4,722,025 | 1/1988 | Robinson | 206/719 |
| 4,746,574 | 5/1988 | Hattori et al. | 206/720 |
| 4,778,058 | 10/1988 | Yamazaki et al. | 428/35.3 |
| 4,792,042 | 12/1988 | Koehn et al. | 206/721 |
| 4,875,581 | 10/1989 | Ray et al. | 206/720 |
| 5,073,421 | 12/1991 | Akao | 428/358 |
| 5,097,949 | 3/1992 | Heldwein | 206/720 |
| 5,209,964 | 5/1993 | Nakagawa | 428/35.3 |

FOREIGN PATENT DOCUMENTS

| | | |
|---|---|---|
| 0 003 402 | 8/1979 | European Pat. Off. . |
| 2 196904 | 3/1974 | France . |
| 43 09 832 A1 | 1/1994 | Germany . |

*Primary Examiner*—Rena Dye
*Attorney, Agent, or Firm*—Connolly & Hutz

[57] ABSTRACT

The packaging container according to the invention for receiving filled product can be used as a self-supporting container or as an in-liner or insert container in supporting outer containers such as corrugated paperboard boxes, wooden cases, box pallets with mesh panels, or drums. The packaging container comprises a multilayered composite film combination which is made up of a polymer film with barrier layer properties, acting as the outer layer of the container, an intermediate layer made of an electrically conductive material and also a further polymer film, forming the inner layer of the packaging container. According to the invention, the further polymer film, forming the inner layer of the packaging container, bears a perforation pattern and the electrically conductive intermediate layer is in connection with a grounding system via electric contact points. The polymer film forming the inner layer of the packaging container is preferably a heat-sealable monofilm or a coextruded film.

17 Claims, 4 Drawing Sheets

5,759,649

PLASTIC PACKAGING CONTAINER WITH IMPROVED ABILITY FOR ELECTROSTATIC CHARGE DERIVATION

BACKGROUND OF THE INVENTION

Containers of an extremely wide variety of types, in particular concerning their materials and structural design, are used both in the industrial sector and in the selling of consumer goods for the filling, storing and transporting of solid, liquid and pasty products. For handling solid filled products in powder, granule or chip form or in the form of pieces, an extensive range of containers is available, such as drums, canisters or buckets made of sheet metal or plastic, fiber drums, sacks made of paper, plastic or textile fabrics, flexible intermediate bulk containers (FIBCs) made of synthetic wovens or plastic films, cases made of wood or corrugated paperboard with inner containers (so-called bag in box) etc.

By virtue of the favorable properties of plastics, the abovementioned packaging means are increasingly produced from polymeric materials. However, the poor electric conductivity of plastics stands in the way of universal use of plastic packaging means, in particular in areas where the risk of explosion cannot be ruled out during the filling and emptying of the packed product, due to the electrostatic charging of the latter. Measures to improve this, for instance by incorporating conductive additives, such as for example carbon black, graphite etc., into the polymer matrix or by surface coating of the plastic packaging means with anti-statics can only be described as unsatisfactory. Either the incorporated additives or surface-applied additives do not ensure permanent conductivity of the polymer over the entire duration of its intended use or the additives impair other specific properties of the polymer material. For example, the amounts of carbon black or graphite necessary for good conductivity adversely affect to a considerable extent the mechanical strength, the sealing behavior, the abrasion resistance and the permeation behavior of a polymer material, or of the product produced from it, e.g. a film.

SUMMARY OF THE INVENTION

On the basis of the shortcomings of the plastic containers commercially available on the market, the object was consequently to propose a transport container which can act both as an independently self-supporting system and in combination with supporting outer containers as a so-called "in-liner", and to overcome the disadvantages of the known systems by the following properties, such as good, permanent ability for electric charge derivation, low permeation effect with respect to oxygen and moisture, high abrasion resistance with respect to the filled product, simple and inexpensive production, variable in shape.

This object is achieved by the packaging container according to the invention being produced from a composite film combination which comprises a polymer film with barrier layer properties, acting as the outer layer of the container, an intermediate layer made of electrically conductive material and also a further polymer film, forming the inner layer of the container, the polymeric container inner layer having a perforation pattern with clearances via which the charge transfer from the electrostatically charged filled product to the electrically conductive container intermediate layer and to a grounding system in contact with the latter takes place.

BRIEF DESCRIPTION OF THE DRAWINGS

Before the embodiment of the packaging container according to the invention is described in more detail, the principle of the invention is to be explained more precisely below with reference to drawings.

DETAILED DESCRIPTION OF THE INVENTION

Figure 1:
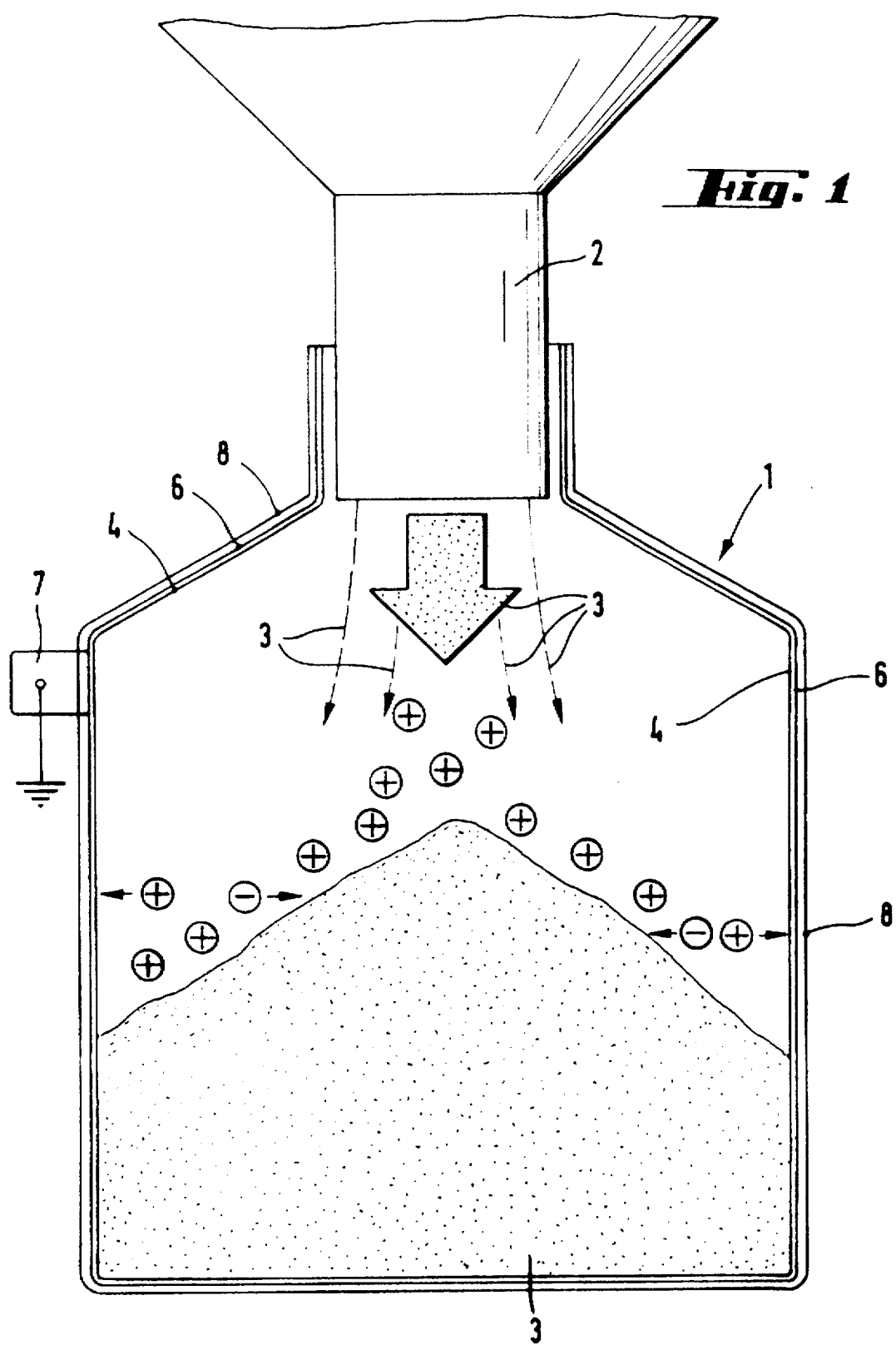
FIG. 1 shows the basic physical principle of charge transfer by a diagrammatically sketched container according to the invention.

In FIG. 1 it is specifically shown how the packaging container 1 is filled through the filling tube 2 with the packed product 3 from a supply silo (not shown). During this operation, the product 3 experiences electric charges on account of friction and separating processes. These electrostatic charges accumulate in the product 3 and, after reaching the breakdown voltage, set off a gas discharge, as a consequence of which a charge transfer from the product 3 to the container inner wall 4 commences. According to the invention, the charges pass from the packaging container 1 via the openings 5 made in the inner layer 4 to the electrically conductive intermediate layer 6 and are conducted from the latter on via a contact point 7 in connection with it to ground. The container outer layer 8 advantageously performs not only the protective function for the electrically conductive intermediate layer 6 with respect to mechanical damage but at the same time also a barrier effect with respect to oxygen or other gases, moisture, aromatics and the like.

Figure 2:
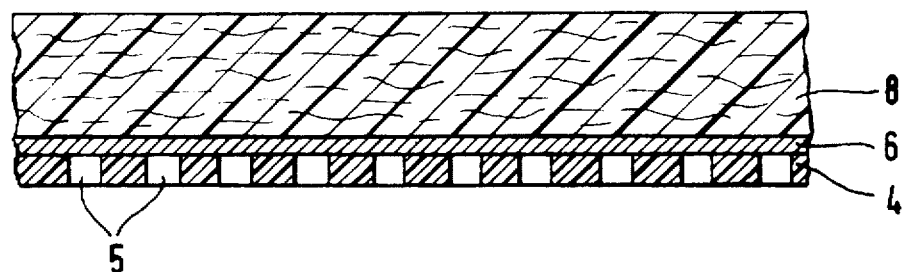
FIG. 2 shows a cross section through a composite film combination suitable for the packaging container according to the invention.

For forming the packaging container according to the invention, composite film combinations are preferred, since a packaging container meeting a specific set of requirements can be created by selecting suitable individual components having specific properties. With regard to the selection of the material for the container inner layer 4 according to FIG. 2, removal of the previous absolute need for this material to have electric conductivity gives the producer much more freedom. For instance, unpigmented, more abrasion-resistant films which are more temperature-resistant with respect to bulk material filled in a hot state or are rendered dehesive with respect to attachment of their filled product can be used according to the invention. Films of polyester, polypropylene, polyethylene, polyamide, fluoropolymers, ethylene-vinyl alcohol copolymers etc. come into consideration, for example, for this. Should the films of the abovementioned polymers not be heat-sealable, the packaging container according to the invention is produced by adhesive bonding by means of suitable adhesives, hot-melts or self-supporting adhesive layers in sheet form. However, heat-sealable films either as a monofilm or else a coextruded film are preferably used for the inner layer 4. As a result, the production operation for the packaging container according to the invention can be made significantly less costly.

The perforation pattern in the form of openings 5 made in the container inner layer 4 for the charge outflow may be applied to the monofilm 4 in a simple way already before the laminating of the films to form the triple laminate.

Conventional processes such as flame perforation, punching, needling or corona perforation are suitable for this. A subsequent perforation step on the finished composite combination by means of laser technology is also conceivable.

Figure 3:
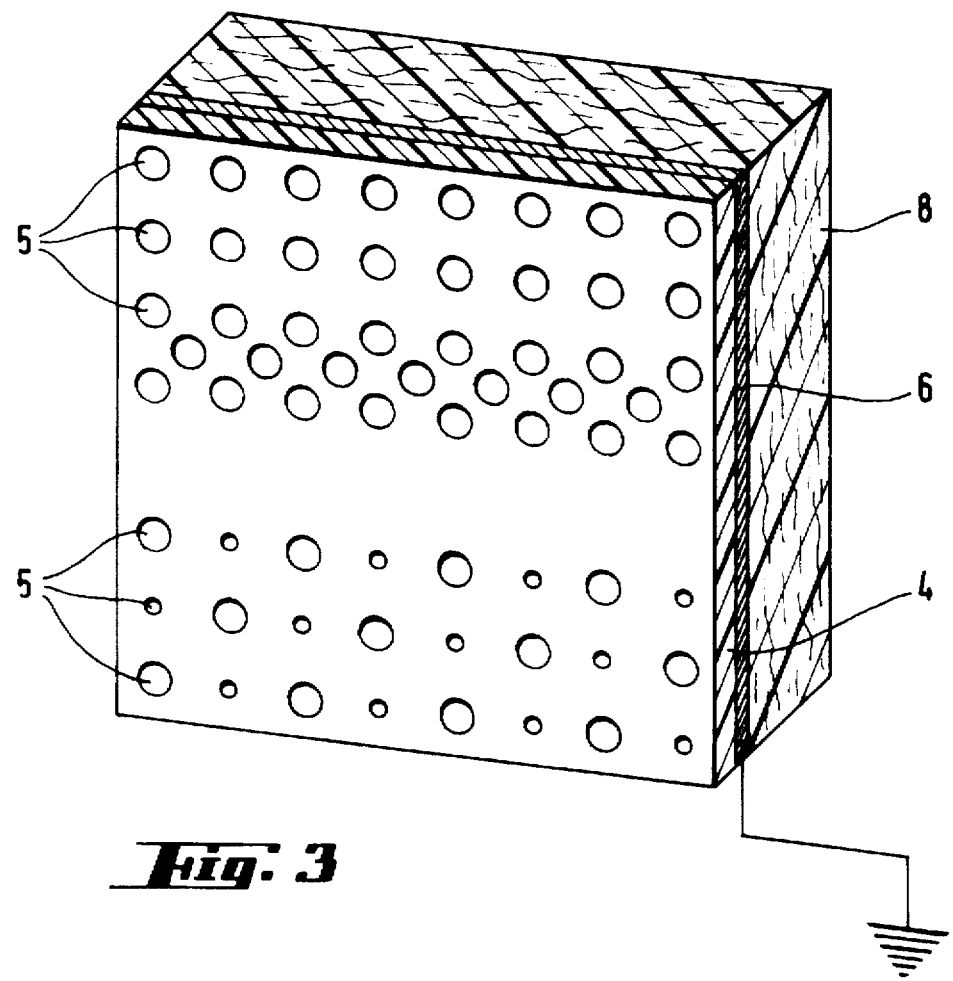
FIG. 3 shows examples of possible perforation patterns by a detail from one container wall.

The perforation patterns shown in FIG. 3 only represent one example of a multiplicity of possible configurations.

The size, number and spacing of the openings depend on the surface resistance aimed for or admissible. The geometrical shaping of the form of the opening is substantially a matter of free choice; the openings preferably have a round form. The spacing between the individual openings lies in the range between 5 and 30 mm, preferably from 5 to 20 mm. The average diameter of the openings may lie between 0.2 and 10 mm, preferably between 0.3 and 5 mm. The openings may have substantially the same or else different sizes in relation to one another.

The material used as container intermediate layer 6 is, according to the invention, primarily to have good electric conductivity. In this respect, metal layers are in first place by far of the materials which come into consideration. Thin aluminum foils in thicknesses of 3 to 12 μm, such as are customary for example for the production of flexible food packaging, are a preferred solution according to the invention.

A further variant is represented by films of intrinsically conductive polymers on the basis of polyacetylene, polypyrrole, polyparaphenylene, polyparaphenylene sulfide, polythiophene or charge-transfer complexes. Alternatively to the abovementioned products, films whose polymer matrix has been modified by the incorporation of electrically conductive pigments, such as for example carbon black, graphite or carbon fibers, also come into consideration.

Likewise to be considered are films on which conductive layers are applied, both over the full surface area and partially, by coating, printing, vacuum metallization or sputtering. All that is important is that the conductive tracks or structures correspond to the perforation of the packaging container inner layer. If the methods described above are used for achieving conductive layers, the construction of the packaging container according to the invention can be simplified to the extent that the electrically conductive layer 6 is applied directly to the side of the container outer layer 8 which is brought into contact with the perforated container inner layer 4 during lamination. In this case, the electrically conductive intermediate layer 6 is not a self-supporting substrate but a component part of the container outer layer 8.

The function of the electrically conductive intermediate layer 6 can also be performed by fibrous structures which consist either of metallic materials, synthetic, inherently conductive materials, such as for example carbon fibers, or products which have been made conductive by surface preparation, such as for example metallization. To this extent, the intermediate layer 6 may, for example, consist of textile, glass, carbon or aramid fibers or sheet-like structures of the abovementioned fibers in the form of laid, woven, knitted or nonwoven fabrics.

As far as the outer layer 8 of the container according to the invention is concerned, it should advantageously have on the one hand high mechanical strength with respect to damage during transportation and handling and on the other hand a good barrier effect with respect to oxygen and/or other gases, moisture, aroma loss etc. According to the invention, particularly suitable for this are monofilms or extruded multilayer films of polyester, polyamide, ionomers, ethylene-vinyl alcohol copolymers etc. The enumeration of the abovementioned products does not, of course, exclude other suitable materials.

The container according to the invention can be produced by adhesive bonding by means of suitable adhesives, by thermal welding or ultrasonic welding, the ultimate shape of the container already being established here by correspondingly shaped individual parts being provided. With the use of suitable film combinations, the production of a preform with subsequent final forming using thermoforming processes is also possible. This method will be used in particular whenever the packaging container according to the invention as a so-called "inliner" must correspond to an outer container of predetermined form.

Figure 4:
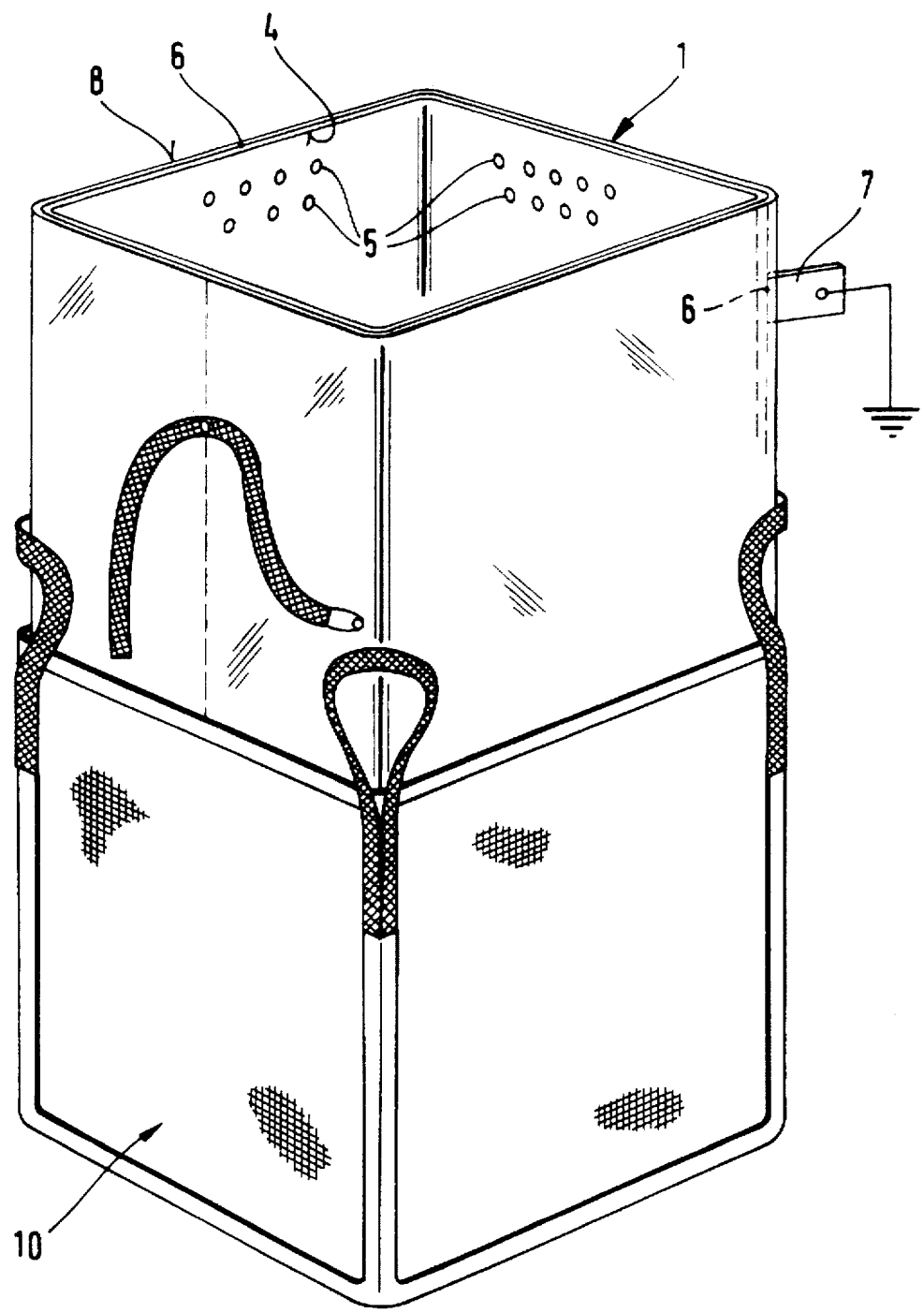
FIG. 4 shows a packaging container according to the invention as a so-called "in-liner" in a flexible intermediate bulk container (FIBC).
Figure 5:
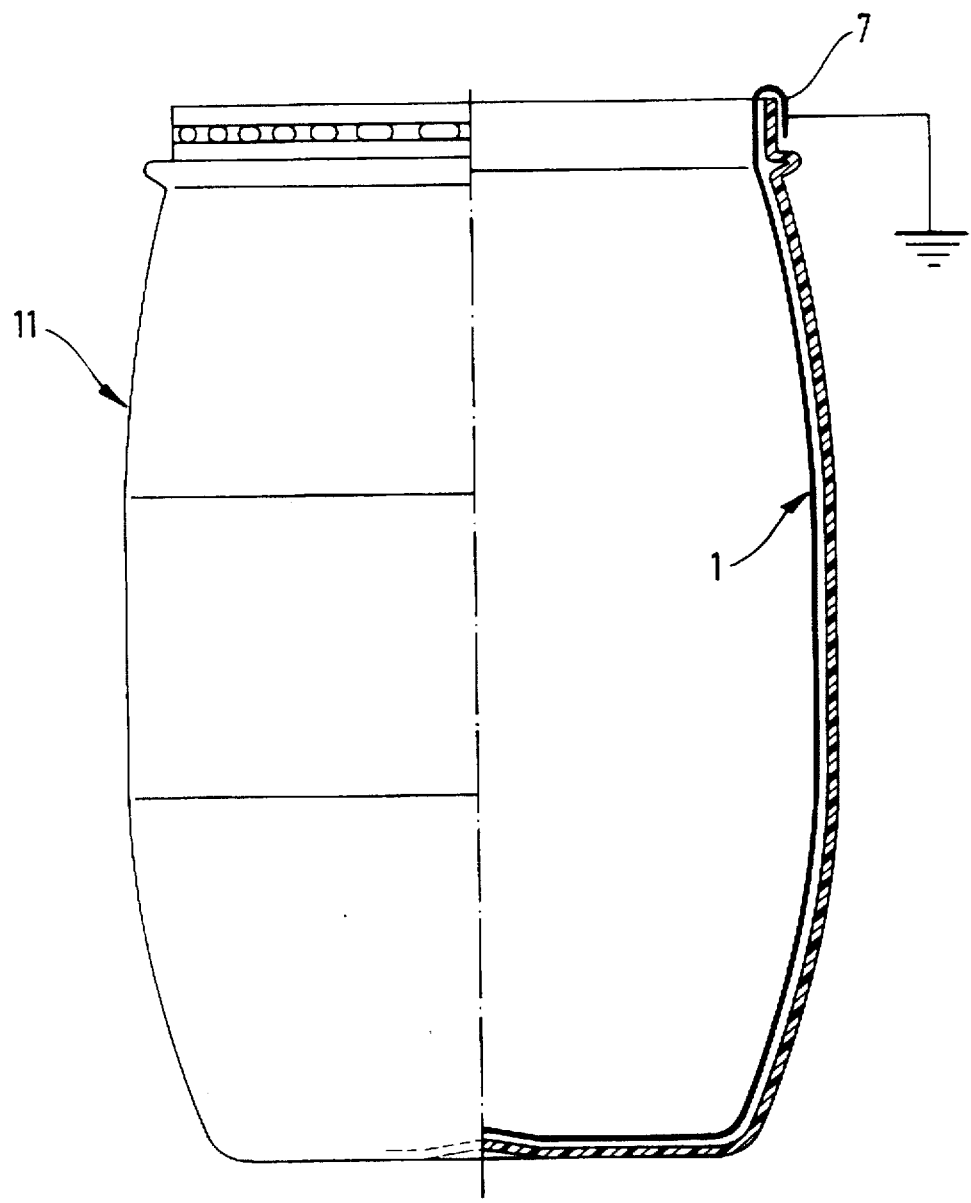
FIG. 5 shows a container according to the invention as a thermoformed "in-liner" in a drum.

The application possibilities of the packaging container according to the invention as an "in-liner" are explained in more detail by FIGS. 4 and 5. FIG. 4 shows the container 1 according to the invention in its function as a cubically welded "in-liner" in a flexible intermediate bulk container 10, which conventionally comprises uncoated or coated textile fabrics made of polyester or polypropylene fibers. If, in operational practice, a good intimate contact between the filler neck of the packaging container according to the invention and the filling neck of the supply silo, which filling neck is generally made of metal, is ensured, under certain circumstances it is possible to dispense with separate grounding contacts 7.

FIG. 5 shows the packaging container 1 according to the invention as an "in-liner" in a blow-molded plastic drum. The form of the "in-liner" 1, corresponding to the outer container 11, is achieved by thermoforming.

For application areas in which, for less critical products, the packaging container does not need to have any barrier effect, or only a slight barrier effect, just a two-layered composite film combination may also be used, for container production. In this case, the composite film combination then comprises a polymeric inner layer with perforation and an electrically conductive outer layer, connected to ground potential, of the conductive materials described above.

We claim:

1. A packaging container for receiving filled product, comprising a multilayered composite film combination which is made up of a first polymer film with barrier layer properties, acting as the outer layer of the container, an intermediate layer made of an electrically conductive material and a seconds polymer film, forming the inner layer of the packaging container, wherein the second polymer film, forming the inner layer of the packaging container, has a perforation pattern and wherein the electrically conductive intermediate layer is connected to ground.

2. The packaging container as claimed in claim 1, wherein the second polymer film forming the inner layer of the packaging container is a heat-sealable monofilm or a coextruded film.

3. The packaging container as claimed in claim 1, wherein the first and second polymer films forming the inner layer and the outer layer of the container are made of polyester, polypropylene, polyethylene, polyamide, fluoropolymers, ethylene-vinyl alcohol copolymers, polyvinylchloride, polyvinylacetate, polycarbonate or polyacrylonitrile.

4. The packaging container as claimed in claim 1, wherein the perforation pattern of the inner layer has openings made by flame perforation, punching, needling, corona perforation or laser.

5. The packaging container as claimed in claim 1, wherein the electrically conductive intermediate layer contains a metal.

6. A packaging container as claimed in claim 5, wherein the metal is selected from the group consisting of aluminum, copper, nickel and iron.

7. The packaging container as claimed in claim 1, wherein the electrically conductive intermediate layer contains intrinsically conductive polymers.

8. The packaging container as claimed in claim 1, wherein the electrically conductive intermediate layer is made up of polymers in whose matrix electrically conductive pigments are incorporated.

9. A packaging container as claimed in claim 8, wherein the pigments are selected from the group consisting of carbon black, graphite coke and carbon fibers.

10. The packaging container as claimed in claim 1, wherein the electrically conductive intermediate layer is formed as a conductor layer applied to a supporting substrate by printing, coating, vacuum metallization or sputtering.

11. The packaging container as claimed in claim 10, wherein the polymeric outer layer of the packaging container being used as the supporting substrate.

12. The packaging container as claimed in claim 1, wherein the electrically conductive intermediate layer is formed from conductive fiber structures in the form of laid, woven, knitted or nonwoven fabrics.

13. The packaging container as claimed in claim 1, wherein the electrically conductive intermediate layer is formed as a discontinuous intermediate layer.

14. The packaging container as claimed in claim 1, wherein the first polymer film forming the outer layer of the container is a mechanically high-strength film having a low permeation effect with respect to gases, moisture and aromatics.

15. The packaging container as claimed in claim 1, wherein the second polymer film forming the inner layer or the first polymer film forming the outer layer comprises uniaxially or biaxially stretched polymer films.

16. A packaging container as claimed in claim 15, wherein the first polymer film forming the outer layer of the container has a low permeation effect with respect to oxygen.

17. The packaging container as claimed in claim 1, wherein the first polymer film forming the outer layer of the packaging container is perforated.

* * * * *

UNITED STATES PATENT AND TRADEMARK OFFICE
CERTIFICATE OF CORRECTION

PATENT NO. : 5,759,649
DATED : June 2, 1998
INVENTOR(S) : Peter Dinter et al.

It is certified that error appears in the above-indentified patent and that said Letters Patent is hereby corrected as shown below:

Column 4, line 46, (claim 1, line 6) "seconds" should read -- second --.

Column 5, line 20, (claim 11, line 3), "being" should read -- is --

Signed and Sealed this

Twenty-fifth Day of August, 1998

Attest:

BRUCE LEHMAN

*Attesting Officer*    *Commissioner of Patents and Trademarks*